UNITED STATES PATENT OFFICE.

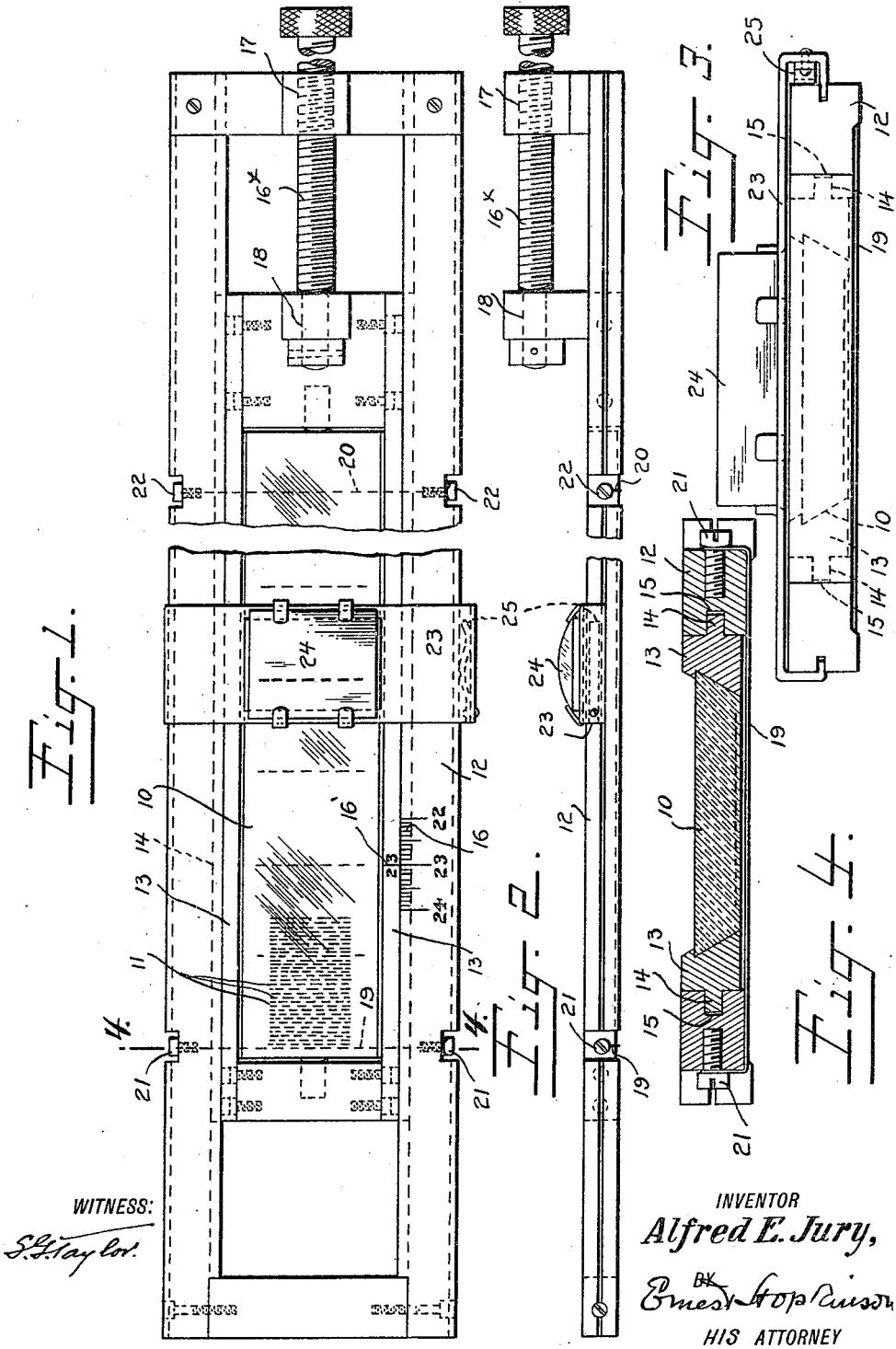

ALFRED E. JURY, OF NEW YORK, N. Y., ASSIGNOR TO RUBBER REGENERATING COMPANY, A CORPORATION OF INDIANA.

INDICATOR.

1,271,907.  Specification of Letters Patent.  Patented July 9, 1918.

Application filed December 2, 1916.  Serial No. 134,635.

*To all whom it may concern:*

Be it known that I, ALFRED E. JURY, a citizen of the United States, residing at New York, county of New York, and State of New York, have invented certain new and useful Improvements in Indicators, of which the following is a full, clear, and exact description.

This invention relates to indicators. An object is to provide a device adapted to indicate numerical differences between standard divisions of an article to be investigated and the actual divisions of the article. One embodiment of the invention will be described, adapted to indicate numerical differences between the standard number of threads per unit length of tire fabric, and the actual number of threads of the fabric.

To learn the number of threads per inch in tire fabric it has hitherto been customary to manually count the threads for a distance of several inches, and then from the sum calculate the average number of threads per inch. This is necessary in order to learn whether the threads per inch fall below or are greater in number than the standard. Tire fabric seldom varies more than one thread under or one thread over the standard, that is, twenty-three threads per lineal inch. Thus it will be appreciated that manually counting the threads throughout a length of ten inches, for instance, in order to calculate the average threads per inch is both laborious and is prone to result in error. The present invention provides an indicator which, as a result of a simple manipulation upon the fabric, will indicate not only the sum of the number of threads over or under the standard number for ten more or less lineal inches of the fabric, but also will indicate the average number of threads per inch.

The invention can be readily understood from the following description taken in connection with the accompanying drawing in which:

Figure 1 is a plan view of the device with a portion broken away.

Fig. 2 is a side elevation of the parts shown in Fig. 1.

Fig. 3 is an enlarged end elevation of the device.

Fig. 4 is an enlarged cross-sectional view on the line 4—4 Fig. 1.

Referring now to the drawing in which like characters of reference designate similar parts, 10 designates a sliding scale, which is transparent, and which is equipped for a distance of ten inches with divisions 11, corresponding to the standard number of threads in this length of tire fabric, that is, there will be two hundred and thirty divisions. In the broadest aspect of the invention, however, the divisions may be standard divisions arranged according to standard divisions of any article to be investigated. A secondary scale 12 constitutes a support in which the sliding scale 10 is fitted, the latter being preferably mounted in a frame 13 having guide ribs 14 slidably fitting in guide grooves of the secondary scale 12. The secondary scale 12 is provided with divisions 16 arranged, in connection with a line 16' on the sliding scale, to indicate the movement of the sliding scale, whereby when the divisions of the sliding scale are made to progressively coincide with the corresponding threads on the fabric, the divisions 16 of the secondary scale will indicate the algebraic sum of all the differences between the divisions of the sliding scale and the number of threads of the fabric, and also the average difference, as will be presently described.

For manipulating the sliding scale 10, in order to make the divisions thereon progressively coincide with the corresponding threads of the fabric, a screw 16$^x$ is threaded into the opening 17 in the secondary scale 12 and is swiveled at the end in an opening 18 in the frame of the sliding scale. By turning the screw the sliding scale may be advanced or moved backward upon the secondary scale, according to the direction of rotation of the screw.

Secured to the secondary scale is a pair of hair lines 19—20, the same in the present invention being fine wires terminally secured in place by screws 21 and 22. These hair lines in the present embodiment are placed ten inches apart and denote the distance throughout which the threads are to be counted as will presently be fully described.

Slidably fitted on the secondary scale is a clip 23, which carries a magnifying glass 24, the clip being yieldingly held stationary on the secondary scale by a leaf spring 25 and being adapted to be readily slid longitudinally of the secondary scale in order that the operator may progressively view the threads of the fabric exposed through the transparent sliding scale 10.

In operation, the device is placed upon the fabric so that the bottom surface of the transparent sliding scale 10, on which the divisions 11 are marked, is in contact with the fabric to be investigated, with the divisions lying parallel to one set of the threads of the fabric. The hair line 19 at the left of the device is placed to coincide with any one thread of the fabric. Beginning at the hair line 19, the operator views the threads through the magnifying glass 24, and progressively moves the glass along toward the right noting whether each division 11 coincides with a corresponding thread of the fabric. If at any point a division on the scale does not coincide with the thread it should coincide with, it is made to coincide with the thread by turning the screw 16 in the proper direction. Sometimes the sliding scale must be moved backward. At other times it must be moved forward. Obviously when the standard number of threads exist it will not be necessary to move the scale since in this case each division initially coincides with a corresponding thread of the fabric. When the adjustment of the sliding scale is finished, the result of the movements made by the sliding scale will be indicated on the secondary scale 12 by the line 16' on the sliding scale registering with one of the divisions 16 on the secondary scale. The particular division of the secondary scale registering with the line 16' will indicate the differences between the divisions 11 on the sliding scale and the number of threads of the length of fabric between the hair lines 19—20. For instance, suppose that the sliding scale has been moved forward ten times. The line 16' will be in register with the tenth division to the right of the starting point, which is at "23" on the secondary scale. This indicates there is ten less threads throughout the ten inches of fabric than the standard number, that is, twenty-three threads per inch. If there are ten less threads in the ten inches than the standard number of twenty-three threads per inch, the average number of threads per inch will be twenty-two and this average may be read upon the secondary scale. Conversely, suppose the sliding scale has been moved rearwardly ten times, this will be indicated by the line 16' coming into register with the tenth division of the secondary scale to the left of the starting point "23", and also in this case the average number, or twenty-four, may be read upon the scale. When the sliding scale is moved in either direction less than ten times, the sum of the movements will be indicated by the line 16' coming into register with the proper division of the secondary scale, and the average will be read in tenths of a thread.

Although I have described a particular embodiment of the invention especially adapted to indicate the variation, if any, from a standard number of threads in a particular fabric, the invention is not limited to a device of this specific construction, since various modifications within the scope of the appended claims may be resorted to in applying the principle of the invention to various uses for which it may be suited.

Having thus described my invention, what I claim and desire to protect by Letters Patent is:—

1. An indicator comprising a slidable scale having divisions arranged thereon according to divisions of the standard article, and a secondary scale having divisions arranged in register with a marker on the slidable scale to indicate any variation between said standard divisions of the scale and the actual divisions of the article to be investigated, whereby when the divisions of the slidable scale are made to progressively coincide with the corresponding divisions on the article to be investigated, the divisions on thet secondary scale will indicate the algebraic sum of all the differences between the divisions on the slidable scale and those of the article being investigated.

2. An indicator comprising a slidable scale having divisions arranged thereon according to divisions of the standard article, and a secondary scale having divisions arranged in register with a marker on the slidable scale to indicate any variation between said standard divisions of the scale and the actual divisions of the article under investigation, whereby when the divisions of the slidable scale are made to progressively coincide with corresponding divisions on the article to be investigated, the divisions of the secondary scale will indicate the average of all the differences between the divisions on the slidable scale and those of the article to be investigated.

3. A device for indicating the number of threads per unit length of fabric comprising a slidable scale having divisions corresponding to the number of threads per unit length of the standard fabric, and a secondary scale having divisions arranged in register with a marker on the slidable scale to indicate any variation between said standard divisions of the scale and the actual divisions of the fabric under investigation, whereby when the divisions of the slidable scale are made to progressively coincide with the corresponding threads of the fabric to be investigated, the divisions of the secondary scale will indicate the algebraic sum of all the differences between the divisions on the slidable scale and the number of threads of the fabric under investigation.

4. A device for indicating the number of threads per unit length of fabric comprising a transparent slidable scale having divisions corresponding to the number of threads per unit length of a standard fabric, and a frame for the transparent scale having a secondary scale provided with divisions arranged to indicate the variation between the divisions of the transparent scale and the number of threads of the fabric under investigation, whereby when the divisions of the transparent scale are made to progressively coincide with the corresponding threads of the fabric under investigation, the divisions on the secondary scale will indicate the algebraic sum of all the differences between the divisions on the transparent scale and the number of threads of the fabric.

Signed at New York, New York, this 28th day of November, 1916.

ALFRED E. JURY.

Copies of this patent may be obtained for five cents each, by addressing the "Commissioner of Patents, Washington, D. C."